Figure 1:
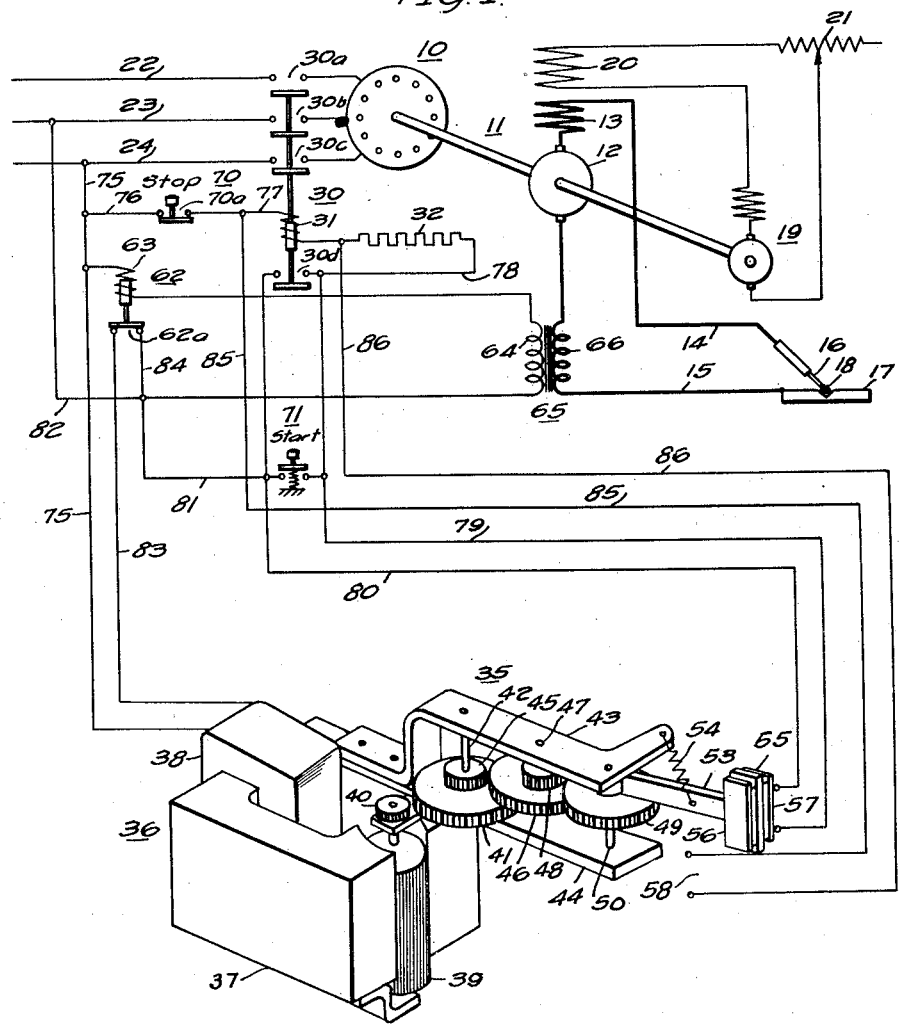

Nov. 1, 1938.　　J. H. BLANKENBUEHLER　　2,135,046
CONTROL FOR WELDING GENERATORS
Filed May 4, 1934　　2 Sheets-Sheet 1

WITNESSES:　　　　　　　　　　　　　　　　INVENTOR
E. A. McCloskey　　　　　　　　　　John H. Blankenbuehler.
R R Lockwood　　　　　　　　　　　　　　　　BY
　　　　　　　　　　　　　　　　　　　　　　　Crawford
　　　　　　　　　　　　　　　　　　　　　　　ATTORNEY Nov. 1, 1938.    J. H. BLANKENBUEHLER    2,135,046
CONTROL FOR WELDING GENERATORS
Filed May 4, 1934    2 Sheets-Sheet 2

WITNESSES:

INVENTOR
John H. Blankenbuehler
BY
ATTORNEY

Patented Nov. 1, 1938

2,135,046

UNITED STATES PATENT OFFICE 2,135,046

CONTROL FOR WELDING GENERATORS

John H. Blankenbuehler, Edgewood, Pa., assignor to Westinghouse Electric & Manufacturing Company, East Pittsburgh, Pa., a corporation of Pennsylvania Application May 4, 1934, Serial No. 723,879

13 Claims. (Cl. 171—118)

My invention relates, generally, to electrical control systems and it has particular relation to control systems for motor-generator arc welding sets.

Heretofore in the use of motor-generator arc welding sets it has been the usual practice to start up the motor-generator when it is desired to perform welding operation and run the motor-generator continuously for long periods of time regardless of whether or not welding current was being used.

I have found that it is desirable to disconnect the motor-generator arc welding set from the power source in the event that the welding operation is discontinued for an appreciable time interval in order to reduce power consumption and further to prevent unnecessary wear on the motor-generator set.

It is also desirable to immediately start up the motor-generator set by connecting the driving motor to the power source when the welding operation is to be resumed. It is further desirable to maintain the driving motor connected to the power source for an interval of time after the welding circuit is once opened by means of time delay apparatus of some sort and to restore the time delay apparatus to its normal condition in the event that the welding circuit is again closed before it functions to disconnect the driving motor.

The foregoing control functions for shutting down and starting up the motor-generator arc welding set should be entirely automatic and also under the control of the operator. It is desirable that this control be effected solely through the operator either opening or closing the main welding circuit thereby making it unnecessary to provide any auxiliary control equipment for the operator, together with necessary conductors for connecting it from the point where welding operations are being performed to the motor generator set itself.

As is often the case, the welding operation is being performed at some distance from the welding set and it would be very inconvenient for the operator himself to go to the set in order to shut it down or to start it up. In the construction of a building the operator may be working several floors above or below the location of the motor-generator set and, rather than take the trouble to shut it down, the operator will permit the set to run even though the welding operation may be discontinued for a relatively long period of time.

The object of my invention, generally stated, is to provide a control system for motor-generator arc welding sets which shall be simple, efficient and reliable in operation, and which may be readily and economically manufactured and installed.

The principal object of my invention is to provide for disconnecting from a power source a motor-generator set connected to supply current to a load, such, for example, as a welding circuit a predetermined interval of time after the welding circuit is opened.

Another important object of my invention is to provide for connecting to a power source a motor-generator set connected to supply current to a welding circuit on completion of the welding circuit.

A further object of my invention is to provide for automatically resetting time delay apparatus whose function is initiated to shut down a motor generator welding set on opening of the welding circuit, if the welding operation is resumed within the predetermined time interval.

Other objects of my invention will in part be obvious and in part appear hereinafter.

My invention accordingly is disclosed in the embodiment hereof shown in the accompanying drawings and comprises the features of construction, combination of elements and arrangements of parts, which will be exemplified in the construction hereinafter set forth and the scope of the application of which will be indicated in the appended claims.

Figure 2:
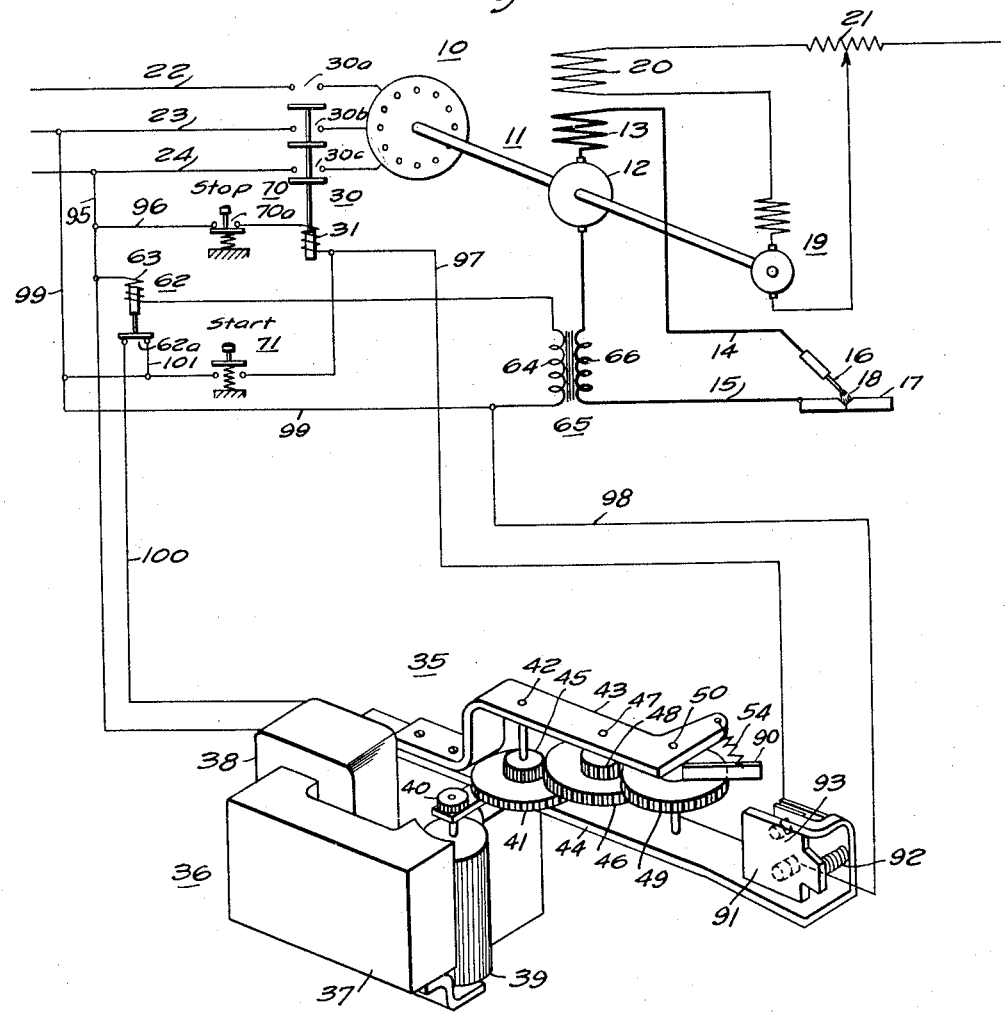

For a more complete understanding of the nature and scope of my invention, reference may be had to the following detailed description taken in connection with the accompanying drawings, in which Figure 1 illustrates diagrammatically a control system organized in accordance with my invention, and Fig. 2 represents diagrammatically a modification of the control system illustrated in Fig. 1.

According to my invention, I provide a motor which is arranged to drive a contact device through a train of gears. The operation of the motor is initiated in response to the opening of the welding circuit and, if the welding circuit is maintained open for a sufficiently long interval of time, the motor will effect, by the operation of the contact members, the opening of the main switch which connects the motor of the motor-generator set to the power source. In the event that the welding circuit is re-established within the predetermined interval of time, the motor will automatically reset so that the interval of time may again be required to be completed before the motor-generator set will be disconnected from the power source.

After the motor-generator set has been disconnected from the power source, it is only necessary for the operator to complete the welding circuit by touching the welding electrode to the work and a circuit will be completed for reconnecting the motor of the motor-generator set to the power source. The welding circuit will then be energized and the welding operation may be performed in the usual manner.

Referring now particularly to Fig. 1 of the drawings, the reference character 10 designates, generally, a three-phase squirrel-cage induction motor which is arranged to drive a direct current welding generator shown generally at 11. The generator 11 comprises an armature 12 and a differential series field winding 13 which are connected to a welding circuit comprising conductors 14 and 15. As illustrated, the conductors 14 and 15 are connected respectively to a welding electrode 16 and work 17 between which a welding arc 18 is maintained for performing the welding operation.

The motor 10 is also arranged to drive an exciter generator, shown generally at 19, which supplies current to excite a main field winding 20 of the welding generator 11. An adjustable resistor 21 is provided in series circuit relation with the main field winding 20 in order to regulate the current flow therethrough for the purpose of regulating the output of the generator 11.

The motor 10 may be energized from any suitable three-phase current source which may be represented by the conductors 22, 23 and 24. It will be understood, however, that any other suitable type of motor 10 may be provided for driving the welding generator 11 and that the motor-generator set comprising the motor 10, the generator 11 and the exciter generator 19 has been shown merely for illustrative purposes.

In order to connect the motor 10 to the conductors 22, 23 and 24, a main switch, shown generally at 30, is provided having an operating winding 31. The main switch 30 is provided with contact members 30a, 30b and 30c, which are arranged to connect the motor 10 to the conductors 22, 23 and 24, respectively, as illustrated. A resistor 32 is connected in series circuit relation with the operating winding 31 for a purpose which will be set forth hereinafter.

In order to deenergize the operating winding 31, a predetermined interval of time after the welding circuit is opened to disconnect the motor 10 from the power source, a time-delay device, shown generally at 35, is provided. The time-delay device 35 comprises a motor shown generally at 36 having a field structure 37 and a field winding 38. A rotor 39 is rotatably mounted between the poles of the field structure 37 and is arranged, when in the deenergized condition, to be positioned slightly out of alignment with the field structure 37, as illustrated. The motor 36 may be of any suitable type but it is preferably of the synchronous type in order to provide for a definite time of operation.

When the field winding 38 of the motor 36 is energized, the rotor 39 is not only caused to revolve but it is also caused to move upwardly to occupy a position of minimum reluctance, as will be readily understood. The rotor 39 is provided with a pinion 40 which is disposed to engage a gear wheel 41 that is rotatably mounted on a shaft 42 secured between brackets 43 and 44 which may be mounted on the field structure 37, as illustrated. A smaller gear wheel 45 is arranged to be driven with the gear wheel 41 and it engages a large gear wheel 46 which is similarly mounted on a shaft 47 and has secured thereto a small gear wheel 48 which engages still another large gear wheel 49 that is mounted on a shaft 50.

A contact arm 53 is carried by the shaft 50 and is arranged to rotate therewith. A spring 54 secured to the contact arm 53 and to the bracket 43 is arranged to bias the contact arm 53 to the position illustrated. The contact arm 53 carries at the end thereof contact bridging members 55 and 56 which are arranged to bridge contact members 57 and 58, respectively.

Due to the reduction gearing interposed between the pinion 40 and the gear wheel 49, the contact arm 53 will be moved relatively slowly as compared to the speed of rotation of the rotor 39 and, therefore, contact members 58 will be closed only after the expiration of a relatively long time interval after the field winding 38 of the motor 36 is energized.

After contact members 58 are bridged by the bridging member 56, the rotor 39 will stall. However, the construction of the motor 36 is such that it will not be injured under this condition of operation due to the fact that the field winding 38 offers a relatively high impedance to the flow of alternating current whether or not the rotor 39 revolves.

In order to initiate the operation of the motor 36, a relay, shown generally at 62, is provided having an operating winding 63 and normally closed contact members 62a. The operating winding 63 of the relay 62 is connected in series circuit relation with a secondary winding 64 of a transformer, shown generally at 65, the primary winding 66 of which is connected in series circuit relation with the welding circuit. When the welding circuit is open, as is the case when the welding electrode 16 is out of arcing engagement with the work 17, the impedance of the secondary winding 64 is relatively high so that only a very low voltage is applied to the operating winding 63 of the relay 62. However, as soon as the welding circuit is completed, the impedance of the secondary winding 64 is reduced to a very small value and a relatively high voltage is applied to the operating winding 63 with the result that contact members 62a are opened. The motor 36 is thereupon deenergized to effect the connection of the motor 10 to the power source.

In the event that it is desired to manually control the operation of the main switch 30, a stop push button switch 70 is provided for opening the circuit to operating winding 31 while a start push button switch 71 is provided for connecting the operating winding 31 to the power source over circuits which will be traced hereinafter.

In operation, it will be assumed that the conductors 22, 23 and 24 are energized, that the main switch 30 is closed and that the welding operation is being performed. The operating winding 63 of the relay 62 will then be energized due to the low impedance offered by the secondary winding 64, its contact members 62a will be opened and the winding 38 of the motor 36 will be deenergized. Contact members 57 will be bridged by the bridging contact member 55 and the operating winding 31 of the main switch 30 will be energized.

The circuit for energizing the operating winding 31 may be traced from the energized conductor 24 through conductors 75 and 76, contact members 70a of the stop switch 70, conductor 77, operating winding 31, resistor 32, conductors 78 and 79, contact members 57, conductors 80, 81 and 82 to the energized conductor 23.

It will be observed that the contact members 57 are shunted by contact members 30d on the main switch 30 so that the operating winding 31 will be maintained energized even though contact members 57 are opened. Start push button switch 71 is also arranged to shunt the contact members 57 in order to permit the operating winding 31 to be manually energized in the event that such operation is desired.

When the welding circuit is opened, the impedance of the secondary winding 64 is increased to such a value that the voltage applied to the operating winding 63 of the relay 62 is insufficient to maintain it in the operated position and, therefore, contact members 62a are closed. The field winding 38 of the motor 36 is then energized and the rotor 39 is moved upwardly to cause the pinion 40 to engage the gear wheel 41 and at the same time it is caused to rotate to move the contact arm 53.

The circuit for energizing the winding 38 may be traced from the energized conductor 24 through conductor 75, winding 38, conductor 83, contact members 62a and conductors 84 and 82 to the energized conductor 23.

In the event that the welding circuit is maintained open for a sufficiently long time, the contact members 58 will be bridged by the bridging contact member 56 and the operating winding 31 of the main switch 30 will be shunted. Due to the fact that the resistor 32 is connected in series circuit relation with the operating winding 31 a short circuit is not applied to the system as will be readily understood. The circuit for shunting the operating winding 31 may be traced from one terminal thereof through conductor 85, contact members 58, and conductor 86 to the other terminal of the operating winding 31.

In the event that the welding circuit is completed before the contact members 58 are bridged, the contact members 62a of relay 62 will be opened and the winding 38 of the relay will be deenergized. The rotor 39 will move downwardly causing the pinion 40 to move out of engagement with the gear wheel 41 and, under the influence of the spring 54, the contact arm 53 will be quickly moved to its initial position. It will thus be observed that the operating winding 31 of the main switch 30 will be maintained energized while the welding operation is being performed and for a predetermined time interval after the welding circuit is opened. However, if the welding circuit is again completed before the expiration of the interval of time, the operation of the main switch will be unaffected.

After the motor 10 has been disconnected from the power source, it is only necessary for the operator to complete the welding circuit in order to reconnect the motor 10 to the power circuit. On completing the welding circuit, the impedance of the secondary winding 64 will be reduced to a low value thereby permitting the operating winding 63 to be energized and opening contact members 62a. The winding 38 of the motor 36 will be deenergized, pinion 40 will move out of engagement with the gear wheel 41 and the spring 54 will retrieve the contact arm 53 to close contact members 57. As soon as contact members 57 are bridged the energizing circuit for the operating winding 31, which has previously been traced, will be completed and the main switch 30 will be operated to connect the motor 10 to the power source.

Referring now particularly to Fig. 2 of the drawings, it will be observed that a control system generally similar to that described hereinbefore is shown. However, certain changes have been made in the circuits. The resistor 32 has been omitted and the contact members operated by the time delay device 35 have been modified.

As illustrated, the shaft 50 carrying the gear wheel 49 is provided with an arm 90 which may be biased by means of the spring 54 in a manner similar to the contact arm 53 described hereinbefore. The arm 90 is arranged to engage a bridging contact member 91 which is pivotally mounted on an extension of the bracket 44. A spring 92 is arranged to bias the contact member 91 into engagement with contact members 93 to bridge them. When the arm 90 engages the bridging member 91, the latter is moved out of engagement with the contact members 93 and the circuit completed thereby is opened.

In describing the operation of the control system shown in Fig. 2 of the drawings, it will be assumed that the conductors 22, 23 and 24 are energized, that the main switch 30 is closed and operating winding 31 is energized, and that the welding operation is being performed. Operating winding 63 of relay 62 will, therefore, be energized and the field winding 38 of the motor 36 will be deenergized. Contact members 93 will, therefore, be bridged.

A circuit for energizing operating winding 31 may be traced from the energized conductor 24 through conductors 95 and 96, contact members 70a of the stop push button switch 70, operating winding 31 of the main switch 30, conductor 97, contact members 93 and conductors 98 and 99 to the energized conductor 23.

In the event that it is desired to manually shut down the set, the push button switch 70 may be depressed thereby opening the energizing circuit to the operating winding 31 of the main switch 30, as will be readily understood. If the set is shut down and it is desired to manually start it, the start button 71 may be depressed to complete an obvious energizing circuit for the operating winding 31.

In the event that the welding circuit is opened, the impedance of the secondary winding 64 will be increased and the operating winding 63 of the relay 62 will be deenergized to such an extent that contact members 62a will be bridged. The operating winding 38 of the motor 36 will then be energized and the arm 90 will be moved to engage the bridging member 91. If the welding operation is again initiated before the arm 90 engages the bridging member 91, the operating winding 63 of the relay 62 will be energized to open the contact members 62a and deenergize the field winding 38. Pinion 40 will then be moved out of engagement with the gear wheel 41 and the arm 90 may be restored to its initial position by means of spring 54.

The circuit for energizing the winding 38 may be traced from the energized conductor 24 through conductor 95, winding 38, conductor 100, contact members 62a, and conductors 101 and 99 to the energized conductor 23.

As long as the welding circuit is maintained open, the operating winding 63 of the relay 62 will be deenergized to such an extent that contact members 62a will be bridged. Therefore, the field winding 38 of the motor 36 will be energized and the bridging member 91 will be maintained out of engagement with the contact members 93. However, as soon as the welding circuit is completed, the operating winding 63 of the relay 62 will be energized to open contact members 62a thereby effecting the deenergization of the field winding 38 and permitting the pinion 40 to drop out of engagement with the gear wheel 41. The spring 54 will then move the arm 90 out of engagement with the bridging member 91 and the energizing circuit for the operating winding 31 of the main switch 30 will be completed, as traced hereinbefore.

In the modification illustrated in Fig. 2, it will be observed that the operating winding 31 is energized almost immediately after the welding circuit is completed due to the fact that it is only necessary for the arm 90 to move a short distance to permit the contact members 93 to be bridged. In the modification illustrated in Fig. 1 of the drawings, it is necessary for the contact arm 53 to be reset to the initial position before the energizing circuit for the operating winding 31 of the main switch 30 is completed. While this period will be relatively short due to the fact that the spring 54 need rotate only the reduction gearing mechanism, it is considerably longer than the period required for effecting the energization of the operating winding 31 when the modification of the invention illustrated in Fig. 2 of the drawings is employed.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

I claim as my invention:

1. Control apparatus for automatically disconnecting from a power source a motor having driving connection with a generator for supplying current to a load circuit comprising, in combination, means for opening and closing said load circuit, a main switch for connecting the motor to the power source, means operable from the power source for effecting the closure of said main switch immediately upon closure of the load circuit, time delay means operable a predetermined interval of time after energization thereof for effecting the opening of said main switch, a relay provided with an operating coil and normally closed contact members for connecting said time delay means to the power source, and variable impedance means connected to the load circuit for controlling the energization of the operating coil, said relay being controlled by the variable impedance means to maintain said contact members open while the load circuit is closed and to effect a closure of said contact members in response to the opening of the load circuit.

2. Control apparatus for automatically disconnecting from a power source a motor having driving connection with a generator for supplying current to a load circuit comprising, in combination, means for opening and closing said load circuit, a main switch for connecting the motor to the power source immediately upon closure of said load circuit, an operating winding for the main switch, a control motor, switch means operable by said control motor a predetermined interval of time after energization thereof for effecting the deenergization of said operating winding and thereby opening said main switch, a relay provided with an operating coil energized from the power source and normally closed contact members for connecting said control motor to the power source, and a transformer connected in the load circuit and in circuit with said relay operating coil to control the operation of said relay, said relay disposed to maintain said switch means open while the load circuit is closed.

3. Control apparatus for automatically disconnecting from a power source a motor having driving connection with a generator for supplying current to a load circuit comprising, in combination, a main switch for connecting the motor to the power source, an operating winding for the main switch, means for opening and closing said load circuit, a control motor, contact means operable by said control motor a predetermined interval of time after energization thereof for effecting the deenergization of said operating winding and thereby opening said main switch, a relay provided with normally closed contact members for connecting said control motor to the power source, an operating winding for said relay disposed when fully energized to open said normally closed contact members, and variable impedance means connected in series circuit relation with said last named operating winding and to the load circuit, said impedance means disposed to provide a high impedance when the load circuit is open and a low impedance when the load circuit is closed thereby causing said normally closed contact members to be opened when the load circuit is closed and closed when the load circuit is opened.

4. Control apparatus for automatically disconnecting from a power source a motor having driving connection with a generator for supplying current to a load circuit comprising, in combination, a main switch for connecting the motor to the power source, an operating winding for the main switch, means for opening and closing said load circuit, a control motor, contact means operable by said control motor a predetermined interval of time after energization thereof for effecting the deenergization of said operating winding and thereby opening said main switch, a relay provided with normally closed contact members for connecting said control motor to the power source, an operating winding for said relay disposed when fully energized to open said normally closed contact members, and a transformer having a primary winding connected in series circuit relation with the load circuit and a secondary winding connected in series circuit relation with said last-named operating winding thereby causing said normally closed contact members to be opened when the load circuit is closed and closed when the load circuit is opened.

5. Control apparatus for automatically disconnecting from a power source a motor having driving connection with a generator for supplying current to a load circuit comprising, in combination, means for opening and closing said load circuit, a main switch for connecting the motor to the power source immediately upon closure of the said load circuit, an operating winding for the main switch, a resistor connected in series circuit relation with said operating winding, a control motor, contact means connected in parallel circuit relation with said operating winding and disposed to be closed by said control motor a predetermined interval of time after energization thereof for shunting said operating winding and thereby opening said main switch, and a relay provided with normally closed contact members for connecting said control motor to the power source, said relay disposed to maintain said contact members open while the load circuit is closed.

6. Control apparatus for automatically disconnecting from a power source a motor having driving connection with a generator for supplying current to a load circuit comprising, in combination, means for opening and closing said load circuit, a main switch for connecting the motor to the power source immediately upon closure of said load circuit, an operating winding for the main switch, a control motor, normally closed contact means connected in parallel circuit relation with said operating winding and disposed to be closed by said control motor a predetermined interval of time after energization thereof for shunting said operating winding and thereby opening said main switch, a relay provided with an operating coil and normally closed contact members for connecting said control motor to the power source, and variable impedance means connected to the load circuit for controlling the energization of the operating coil being controlled by said variable impedance means, said relay to maintain said contact members open while the load circuit is closed and to effect closure thereof in response to the opening of the load circuit.

7. Control apparatus for automatically connecting and disconnecting to and from a power source a motor having driving connection with a generator for supplying current to a load circuit comprising, in combination, means for opening and closing said load circuit, a main switch for connecting the motor to the power source immediately upon closure of the load circuit, relay means connected to be responsive to the closure of the load circuit for effecting the closure of said main switch, and time delay means for effecting the opening of said main switch at the expiration of a predetermined interval of time after the load circuit is opened.

8. Control apparatus for automatically connecting and disconnecting to and from a power source a motor having driving connection with a generator for supplying current to a load circuit comprising, in combination, means for opening and closing said load circuit, a main switch for connecting the motor to the power source immediately upon closure of the load circuit, relay means operable in response to the closure of the load circuit for effecting the closure of said main switch, a control motor disposed to be connected for energization to the power source on opening of the load circuit, and contact means operable by said control motor a predetermined interval of time after energization thereof for effecting the opening of said main switch.

9. Control apparatus for automatically connecting and disconnecting to and from a power source a motor having driving connection with a generator for supplying current to a load circuit comprising, in combination, means for opening and closing said load circuit, a main switch for connecting the motor to the power source immediately upon closure of the load circuit, an operating winding for the main switch, a control motor, switch means operable by said control motor a predetermined interval of time after energization thereof for effecting the deenergization of said operating winding and thereby opening said main switch, said switch means being disposed when said control motor is deenergized to complete an energizing circuit for said operating winding, and a relay provided with normally closed contact members for connecting said control motor to the power source, said relay being disposed to maintain said contact members open while the load circuit is closed.

10. Control apparatus for automatically connecting and disconnecting to and from a power source a motor having driving connection with a generator for supplying current to a load circuit comprising, in combination, a main switch for connecting the motor to the power source, an operating winding for the main switch, means for opening and closing said load circuit, a control motor, contact means operable by said control motor a predetermined interval of time after energization thereof for effecting the deenergization of said operating winding and thereby opening said main switch, said contact means being disposed when said control motor is deenergized to complete an energizing circuit for said operating winding, a relay provided with normally closed contact members for connecting said control motor to the power source, an operating winding for said relay disposed when fully energized to open said normally closed contact members, and variable impedance means connected in series circuit relation with said last named operating winding and to the load circuit, said impedance means being disposed to provide a high impedance when the load circuit is opened and a low impedance when the load circuit is closed thereby causing said normally closed contact members to be opened when the load circuit is closed and closed when the load circuit is opened.

11. Control apparatus for automatically connecting and disconnecting to and from a power source a motor having driving connection with a generator for supplying current to a load circuit comprising, in combination, a main switch for connecting the motor to the power source, an operating winding for the main switch, a control motor, contact means operable by said control motor a predetermined interval of time after energization thereof for effecting the deenergization of said operating winding and thereby opening said main switch, said contact means being disposed when said control motor is deenergized to complete an energizing circuit for said operating winding, a relay provided with normally closed contact members for connecting said control motor to the power source, an operating winding for said relay, and a transformer having a primary winding connected in series circuit relation with the load circuit and a secondary winding connected in series circuit relation with said last named operating winding.

12. Control apparatus for automatically connecting and disconnecting to and from a power source a motor having driving connection with a generator for supplying current to a load circuit comprising, in combination, means for opening and closing said load circuit, a main switch for connecting the motor to the power source immediately upon closure of the load circuit, an operating winding for the main switch, a resistor connected in series circuit relation with said operating winding, normally closed contact means connected in series circuit relation with said operating winding and normally open contact means connected in parallel circuit relation with said operating winding, a control motor for operating said contact means to open said normally closed contact means on energization thereof and to close said normally open contact means a predetermined interval of time after energization thereof, and a relay provided with normally closed contact members for connecting said control motor to the power source, said relay being disposed to maintain said contact members open while the load circuit is closed.

13. Control apparatus for automatically connecting and disconnecting to and from a power source a motor having driving connection with a generator for supplying current to a load circuit comprising, in combination, a main switch for connecting the motor to the power source, an operating winding for the main switch, means for opening and closing said load circuit, normally closed contact means connected in series circuit relation with said operating winding for completing an energizing circuit therefor to effect the closure of said main switch immediately upon closure of said load circuit, a control motor for opening said contact means a predetermined interval of time after energization thereof for deenergizing said operating winding and opening said main switch, and a relay provided with normally closed contact members for connecting said control motor to the power source, said relay being disposed to maintain said contact members open while the load circuit is closed.

JOHN H. BLANKENBUEHLER.